(12) United States Patent
Johnson

(10) Patent No.: US 7,003,530 B2
(45) Date of Patent: Feb. 21, 2006

(54) ALGORITHM FOR SELECTING AUDIO CONTENT

(75) Inventor: Richard Alan Johnson, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 454 days.

(21) Appl. No.: 10/104,137

(22) Filed: Mar. 22, 2002

(65) Prior Publication Data

US 2003/0182316 A1    Sep. 25, 2003

(51) Int. Cl.
*G06F 12/00*    (2006.01)

(52) U.S. Cl. .......................... 707/200; 707/5; 707/10; 707/104.1

(58) Field of Classification Search .................. 707/10, 707/104.1, 200, 5; 715/501.1; 84/604, 609; 705/14, 26; 709/203, 205
See application file for complete search history.

(56) References Cited

U.S. PATENT DOCUMENTS

| | | | | |
|---|---|---|---|---|
| 5,616,876 | A * | 4/1997 | Cluts ........................... | 84/609 |
| 6,199,076 | B1 * | 3/2001 | Logan et al. ............. | 715/501.1 |
| 6,282,549 | B1 * | 8/2001 | Hoffert et al. ........... | 707/104.1 |
| 6,300,880 | B1 * | 10/2001 | Sitnik ..................... | 340/825.25 |
| 6,721,744 | B1 * | 4/2004 | Naimark et al. .............. | 707/10 |

OTHER PUBLICATIONS

580 Memories Custom Radio on the Web information sheet, CKWW-AM, Windsor, Ontario, Canada; 3 pages earliest date unknown.

Musicmatch Radio MX information sheet of Musicmatch.com dated 2001, 2 pages, earliest date unknown.

Article: "Deconstructing Harry Connick, Jr." by Tania Hershman, Wired.com, 3 pages, dated Feb. 20, 2001.

Rapsody internet radio of Listen.com. 1 page, dated 1999-2001.

NOMAD Jukebox C information sheet of Creative Technology, Ltd. dated 1998-2002.

* cited by examiner

*Primary Examiner*—Shahid Alam
*Assistant Examiner*—Fred I. Echichioya
(74) *Attorney, Agent, or Firm*—Kathryn A. Marra

(57) ABSTRACT

An algorithm for selecting audio content including an audio database, a user preference learning routine, and an audio selection routine. The user preference learning routine is capable of explicitly learning by a manual entry made by the user concerning his/her favorite audio selections. The user preference learning routine is capable of implicitly learning by recording the selections made by the user through a preference input. The preference input queries the user whether he/she liked or disliked a particular audio selection. Initially, random selections are provided to the user. If the user does not like the audio selection it is skipped. If the user liked the selection it is recorded. As the user listens or doesn't listen to audio selections, a profile is developed that identifies the user's preferences. The audio selection routine chooses the next audio selection to be played for the user. There are at least two methods of making the audio selection. In the first method, a user sends his/her listening history to a central location. In the second method, a table of at least four items is used to determine the user listening preferences.

9 Claims, 3 Drawing Sheets

ALGORITHM FOR SELECTING AUDIO CONTENT

TECHNICAL FIELD

The present invention relates generally to listening to audio and more specifically to an algorithm for selecting audio content which allows a user to hear audio he/she likes without having to manipulate a radio, CD player, or cassette player.

BACKGROUND OF THE INVENTION

Many people want to hear a source of audio while they are driving such as music, sports, news, weather, or any other information expressed through audio. Many people are not continually satisfied with what is played on the radio which results in a need for constantly changing the channel/station/selection. A CD or cassette player allows a person's preferences to be played, but requires the user to constantly remove and insert the CDs or cassettes. MP3 players and other devices will store several hours of music, but its memory capacity is limited.

What remains needed in the art is an algorithm for selecting audio content which allows a user to continually enjoy a source of audio from a nearly inexhaustive library contained on an audio database.

SUMMARY OF THE INVENTION

The present invention is an algorithm for selecting audio content from a database by learning the preferences of the user. The algorithm for selecting audio content includes an audio database, a user preference learning routine, and an audio selection routine. The audio database is preferably contained on the internet. If the algorithm for selecting audio content is used while in a vehicle, a wireless link connects the hardware which stores the algorithm for selecting audio content to the internet. However, the audio content is usually copyrighted and there must be a method for paying royalties to the copyright holder. One way of paying the copyright holder is to play audio advertisements at sometime when the audio content is played. Another method of paying the copyright holder is through a subscription. Other methods of paying the copyright holder may also be used.

The user preference learning routine preferably has the capability of learning a user's audio preference both implicitly and explicitly. The user preference learning routine is capable of explicitly learning by a manual entry made by the user concerning their favorite audio selection. The user may make explicit entries by entering his/her favorite radio stations, artists, songs, or genres into the audio database. The user preference learning routine is capable of implicitly learning by recording the selections made by the user through a preference input. The preference input queries the user whether they liked or disliked a particular audio selection or not. If the user does not make any explicit entries of audio selections, the user preference learning routine must develop a library of audio selections through like/dislike choices made by the user. Initially, random selections are provided to the user. If the user does not like the audio selection, it is skipped. If the user likes the selection, it is recorded. As the user listens or doesn't listen to provided audio selections, a profile is developed that identifies the user's preferences. Preferences can be related to criteria like genre, artist, news subject, or any other criteria.

The audio selection routine chooses the next audio selection to be played for the user. There are at least two methods of making the audio selection. In the first method, a user sends his/her listening history to a central location. The central location compares the user preferences to those of others with similar preferences and provides the user with audio selections based on the preferences of others. In the second method, tables of at least four items are used to determine the user listening preferences. The first table contains a list of genres. The second table contains a list of artists. The third table contains a list of titles. The fourth table contains a list of all audio content available. Tables two and three are initially empty, but are filled with selections as the user chooses audio selections that he/she likes. Initially, all genres are given an equal weighting factor. The audio selection routine initially makes audio selections from table one. As the user makes new audio selections, weighting factors are applied to the genres, artists, and titles chosen by the user. The greater the weighting factor the greater the probability that a particular genre, artist, or title will be played for the user. It is also possible to initially seed the tables with the user's audio preferences.

Accordingly, it is an object of the present invention to provide an algorithm for selecting audio content which allows a user to choose a source of audio from a nearly inexhaustive library contained on an audio database.

It is an additional object of the present invention to provide an algorithm for selecting audio content which learns the listening preferences of the user.

This and additional objects, features and advantages of the present invention will become clearer from the following specification of a preferred embodiment.

DESCRIPTION OF THE PREFERRED EMBODIMENT

Figure 1:
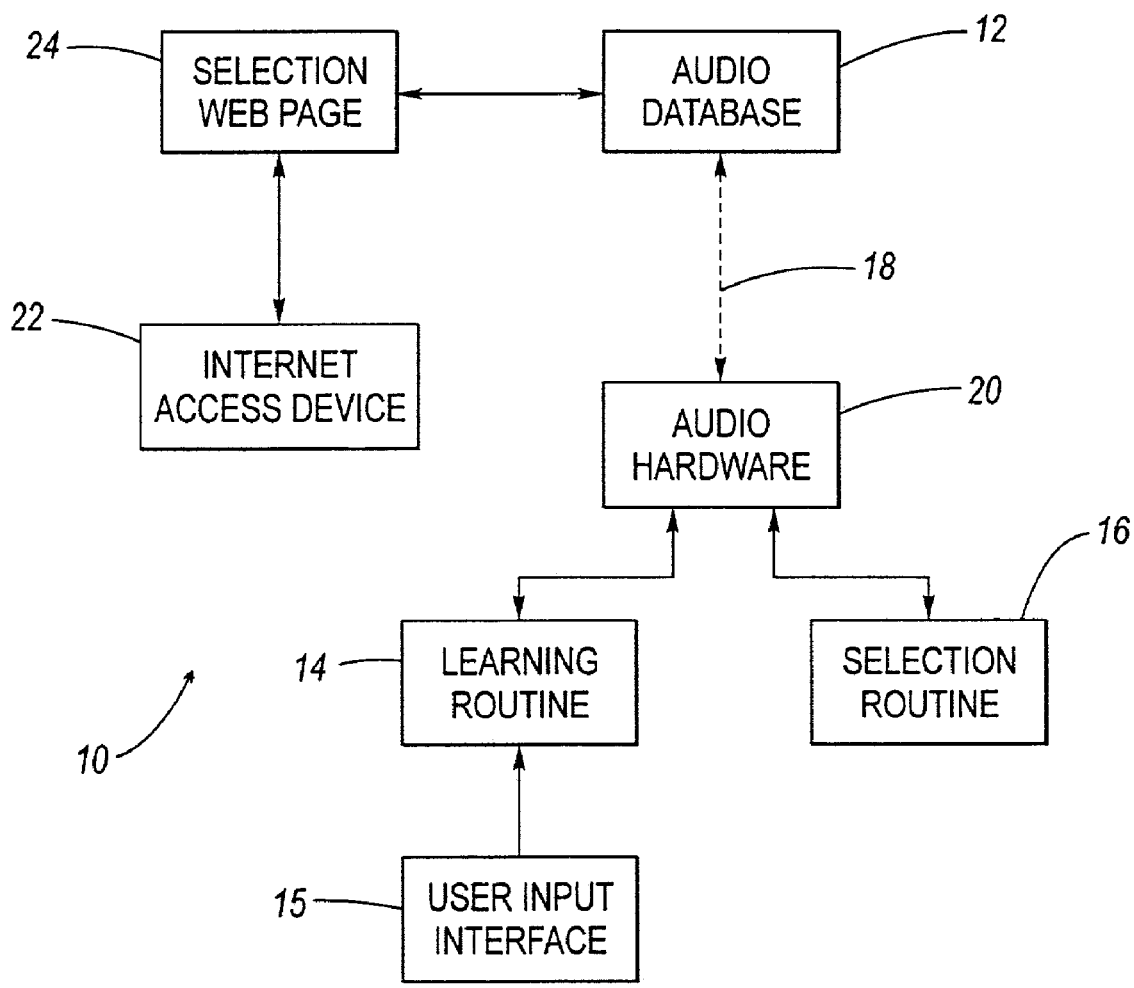
FIG. 1 is a flow chart of an algorithm for selecting audio content.

Referring now to the Drawings, FIG. 1 shows a flow chart of an algorithm for selecting audio content 10. The algorithm for selecting audio content 10 includes an audio database 12, a user preference learning routine 14, a user input interface 15, and an audio selection routine 16. The audio database 12 is preferably contained on the internet. The audio database 12 may be accessible through one or more web sites. A wireless link 18 connects the audio hardware 20 which stores the algorithm for selecting audio content 10 with the audio database 12. The wireless link 18 may be implemented through an RDS channel, a telephone line, or any other suitable communications protocol. It is preferable that the audio content be categorized according to at least one term such as genre, artist, or title.

Playing of individual selections from the audio database 12 requires payment to the copyright holders of the individual selections. One way of paying the copyright holder is to play an audio advertisement sometime before, after, or during the play of the audio content. Another method of paying the copyright holder is through a subscription. Other methods of paying the copyright holder may also be used. The audio content preferably includes music, audio books, news, sports, weather, personalized advertising, and any other information in audio form.

The user preference learning routine 14 preferably has the capability of learning a user's audio preferences both implicitly and explicitly. The user preference learning routine 14 is capable of explicitly learning by a manual entry into a central location made by the user concerning their favorite audio selections. The user would preferably make explicit entries by entering their favorite radio stations, artists, songs, or genres through an internet access device 22 which is capable of connecting with the internet. The audio selections would be entered manually at a special selection web page 24 on the internet. The special web page 24 would transfer the audio selection information entered by the user to the audio database 12.

The user preference learning routine is capable of implicitly learning by recording the selections made by the user through a preference input. The user preference learning routine queries the user whether they liked or disliked a particular audio selection or not. The like or dislike decision is preferably entered through like and dislike buttons or a toggle at the user input interface 15, wherein the user input interface may include other user inputs, such for example next audio selection, prior audio selection, and volume (a four-way toggle may implement the like, dislike next and prior functions). If the particular audio selection was liked, the artist will be saved to an artist file; the title will be saved to a title file, and the genre will be saved to a genre file. Other criteria besides artist, title, and genre may also be used for recording user preferences.

An additional option is to allow the user to skip back to a previous selection and skip forward to a new selection. The like, dislike, skip back, and skip forward selections could be implemented with a four-way switch. Preferably, any criteria that can be correlated to the user's liking or disliking may be supported.

If the user does not make explicit entries of audio selections through the special web site, the user preference learning routine 14 must develop a library of audio selections though like/dislike choices made by the user. Initially, random selections are provided to the user. As the user listens or doesn't listen to provided audio selections, a profile is developed from the artist, title, and genre files which identify the user's preferences.

The audio selection routine 16 chooses the next audio selection to be played for the user. There are at least two methods of making the audio selections. In the first method, a user sends their listening history to a central location. The central location compares the user preferences to those of others with similar preferences and provides the user with audio selections based on the preferences of others.

In the second method, tables of at least four items are used to determine the user listening preferences. The first table contains a list of genres. The second table contains a list of artists. The third table contains a list of titles. The fourth table contains a list of all audio content available. Tables two and three are initially empty, but are filled with selections as the user chooses audio selection that he/she likes. Initially, all genres are given an equal weighting factor. The audio selection routine initially makes audio selections from the first table. As the user makes new audio selections, a weighted random selection method (WRSM) is used to provide a weighting factor for each genre, artist and title chosen by the user.

Each item in each table has a weighting factor. A logarithmic relationship is chosen between a table item's weighting factor and its probability of being selected. This provides for proportional changes in probability for the same incremental changes in the weighting factor across the range of weighing factors. For example: Given an item (n) with a weighting factor $W_n$ and given another item (m) with a weighting factor of $W_m$ and given a number A between 1.2 and 2.2, then the probability P of n being chosen over m is:

$$P = A^{Wn}/A^{Wm}$$

and the probability $P_n$ of n being chosen over all others is:

$$P_n = A^{Wn}/\Sigma A^{Wi}$$

where $0 \leq i \leq i_{max}$ and where A can be chosen to cause probabilities to diverge faster or slower for a given change in the weighting factor. For example, the number A can have a value between 1.2 and 2.2.

There are several possible ways to implement WRSM. In this example WRSM is implemented as follows:
1) randomly select an item n from a table; or
2) get the corresponding weighting factor $W_n$ of that item; or
3) calculate $A^{Wn}$ where $1 < A^{Wn(max)}$; or
4) randomly select a number Q between 1 and $A^{Wn(max)}$, wherein
   a) if $A^W > Q$ the selected item is discarded and step 1 repeated, or
   b) if $A^W < Q$ the selected item is the WRSM item from the table.

The initial conditions of the tables are set as follows. The genre table has all genres available with a nominal weighting factor assigned to each genre. The artist table and the title table are empty. The audio content table contains all audio content available with a pointer to the actual audio content. The user may seed the tables with their preferences by entering them at a central location. The central location is preferably a web page on the internet. Seeding the tables speeds up the convergence to the user's preferences, but is not necessary.

Initially, new audio selections are chosen from the genre table and the audio content table. After the artist, and title tables are filled, a new audio selection may be chosen from the genre, artist, or title tables. The audio selection routine 16 will use WRSM to determine if the selection should be made utilizing the genre, artist, or title tables. The audio selection routine 16 contains a different method for choosing a selection from each table.

Figure 2A:
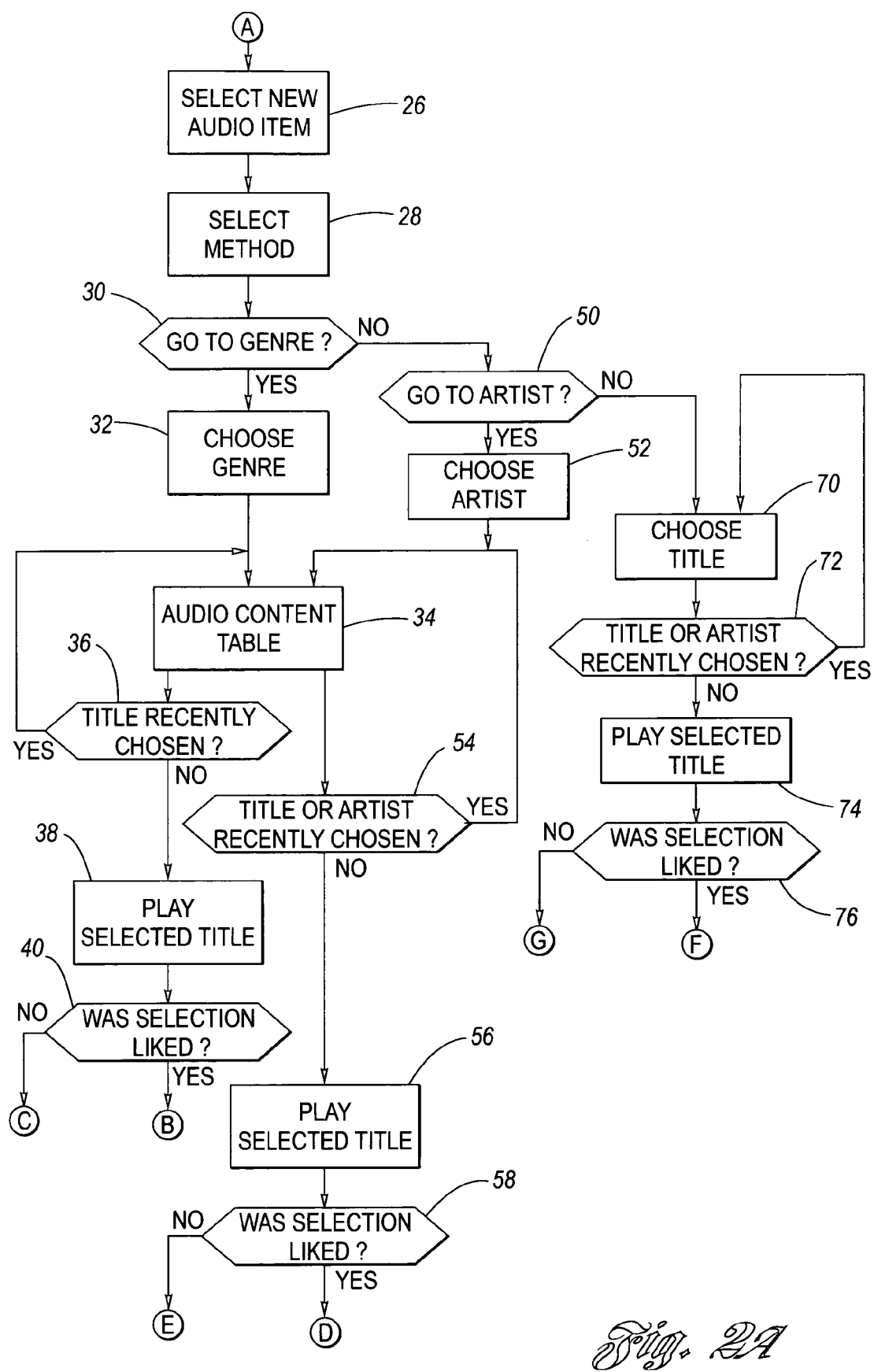
FIGS. 2A and 2B are in combination a flow chart of the selection routine of an algorithm for selecting audio content.
Figure 2B:
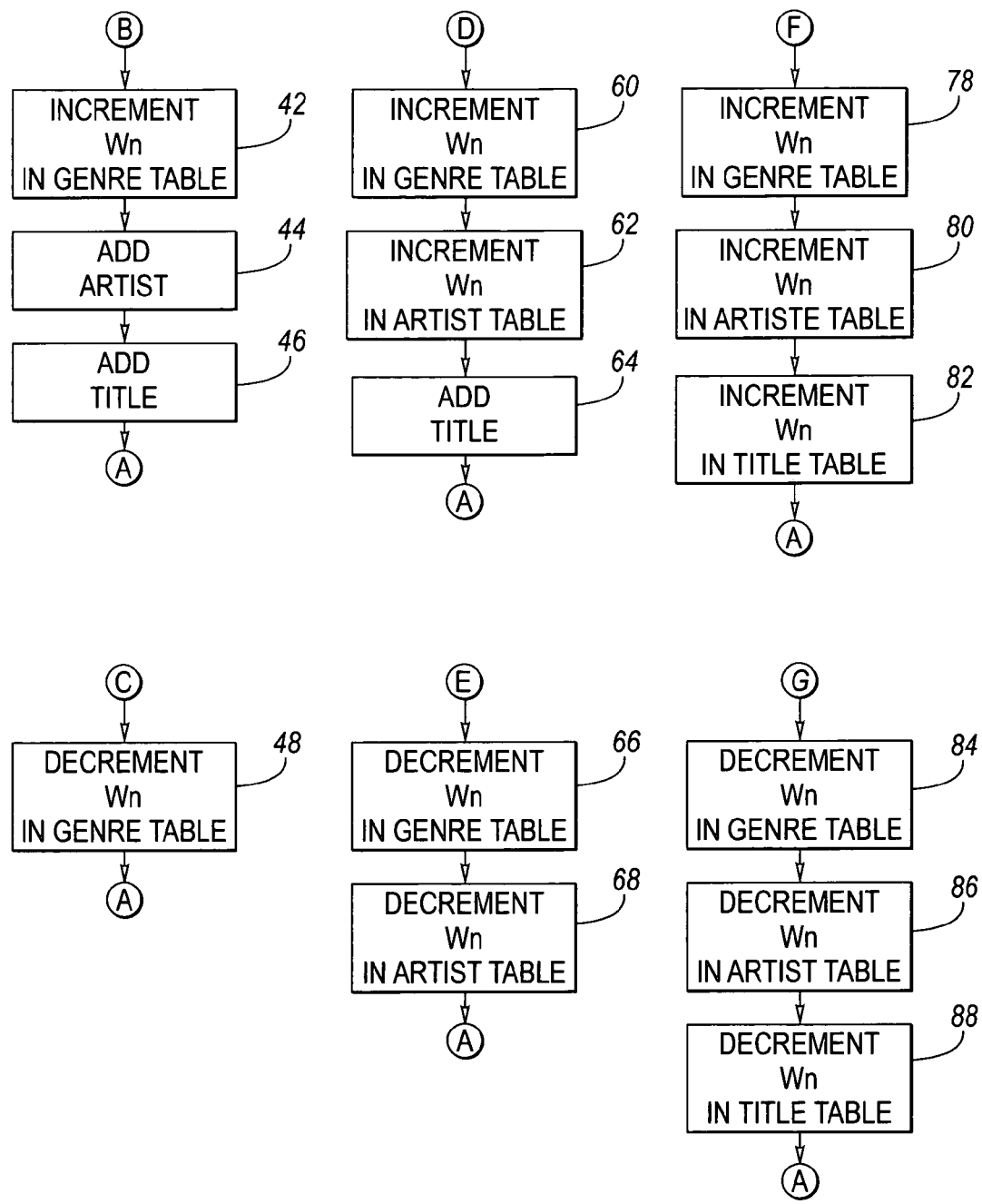

FIG. 2 discloses a flow chart of the audio selection routine 16. The audio selection routine 16 is started by a request to select a new audio item in process block 26. The method of choosing a new audio item is made in process block 28 using WRSM. A genre table method, artist table method, or title table method is chosen in process block 28. If the genre table method is chosen, the audio selection routine 16 proceeds through decision block 30 to choose a genre from the genre table in process block 32. A genre is selected from the genre table based on WRSM in process block 32. A title is randomly selected from all the titles in the genre table of the audio content table 34. In decision block 36, if the title was recently played, the routine returns to the audio content table 34 and another title is selected. If not recently played, the selected title is played in process block 38. In decision block 40, if the user presses the "like" button or listens to the entire selection then $W_n$ is incremented (ie., to $W_{n+1}$) for the genre in the genre table, unless it is at its maximum value, in process block 42. Next, the artist is added to the artist table, along with an initial weighting factor W, in process block 44. Finally, the title is added to the title table, along with an initial weighting factor W, in process block 46. The audio selection routine then returns to process block 26. In process block 40, if the user pressed the "dislike" button or listens to a small part of the audio selection then $W_n$ is decremented (ie., to $W_{n-1}$) for the genre in the genre table unless the decrement would be less than zero in process block 48. The artist is not added to the artist table and the title is not added to title table. The audio selection routine 16 then returns to process block 26.

If the artist table method is chosen, the audio selection routine 16 proceeds through decision block 50 to choose an artist from the artist table based on WRSM in process block 52. A title is randomly selected from among the titles of the chosen artist in the audio content table 34. In decision block 54, if the title was recently played, then the routine returns to process block 34. If not recently played, the selected title is played in process block 56. In decision block 58, if the user presses the "like" button or listens to the entire selection then $W_n$ is incremented for the genre in the genre table, unless it is at its maximum value, in process block 60. Next, $W_n$ is incremented for the artist in the artist table, unless it is at its maximum value, in process block 62. Finally, the title is added to the title table, along with an initial weighting factor, in process block 64. The audio selection routine 16 then returns to process block 26. In decision block 58, if the user pressed the "dislike" button or listens to a small part of the audio selection, then $W_n$ is decremented for the genre in the genre table, unless the decrement would be less than zero, in process block 66. Finally, $W_n$ is decremented for the artist in the artist table, unless the decrement would be less than zero, in process block 68. The title is not added to the title table. The selection routine then returns to process block 26.

If the title table method is chosen, the audio selection routine 16 proceeds to choose a title from the title table in process block 70. In decision block 72, if the title or artist was recently played, then the routine returns to process block 70. If not recently played, the selected title is played in process block 74. In decision block 76, if the user presses the "like" button or listens to the entire selection, then $W_n$ is incremented for the genre in the genre table, unless it is at its maximum value, in process block 78. Next, $W_n$ is incremented for the artist in the artist table, unless it is at its maximum value, in process block 80. Finally, $W_n$ is incremented for the title in the title table, unless it is at its maximum value, in process block 82. The selection routine then returns to process block 26. In process block 84, if the user pressed the "dislike" button or listens to a small part of the audio selection, then $W_n$ is decremented for the genre in the genre table, unless the decrement would be less than zero, in process block 84. Next, $W_n$ is decremented for the artist in the artist table, unless the decrement would be less than zero, in process block 86. Finally, $W_n$ is decremented for the title in the title table, unless the decrement would be less than zero, in process block 88. The audio selection routine 16 then returns to process block 26.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A computer implemented method for selecting audio content for playback to a user comprising the steps of:
    providing a database having a plurality of audio selections, each said audio selection having predetermined selection criteria selectively assigned thereto;
    assigning a first weighting factor to each one of said plurality of audio selections;
    assigning a second weighting factor to each one of said plurality of audio selections;
    assigning a third weighting factor to each one of said plurality of audio selections;
    providing a first table of first selection criteria of said predetermined selection criteria;
    providing a second table of second selection criteria of said predetermined selection criteria;
    providing a third table of third selection criteria of said predetermined selection criteria;
    selecting audio selections from said database based upon a selected one of said first, second and third tables, wherein the selecting of audio selections is further based upon a logarithmic relationship between a predetermined probability of selection of each audio selection and the first weighting factor if the first table is selected, the second weighting factor if the second table is selected, and the third weighting factor if the third table is selected;
    playing audio selections from said database responsive to said step of selecting;
    determining whether a user liked or disliked each played audio selection;
    incrementing the first weighting factor in said first table for each played audio selection if the first table is selected and if the audio selection is liked;
    decrementing the first weighting factor in said first table for each played audio selection if the first table is selected and if the audio selection is disliked;
    incrementing the second weighting factor in said second table for each played audio selection if the second table is selected and if the audio selection is liked;
    decrementing the second weighting factor in said second table for each played audio selection if the second table is selected and if the audio selection is disliked;
    incrementing the third weighting factor in said third table for each played audio selection if the third table is selected and if the audio selection is liked; and
    decrementing the third weighting factor in said third table for each played audio selection if the third table is selected and if the audio selection is disliked.

2. The method of selecting audio content for playback to a user of claim 1, wherein said first table of first selection criteria comprises a genre table of genre selection criteria of said predetermined selection criteria; and wherein said steps of incrementing and decrementing comprise:
    incrementing a genre weighting factor in said genre table for each played audio selection if liked; and
    decrementing the genre weighting factor in said genre table for each played audio selection if disliked.

3. The method of selecting audio content for playback to a user of claim 1, wherein said second table having second selection criteria comprises an artist table of artist selection criteria of said predetermined selection criteria; and wherein said steps of incrementing and decrementing comprise:
    incrementing an artist weighting factor in said artist table for each played audio selection if liked; and
    decrementing the artist weighting factor in said artist table for each played audio selection if disliked.

4. The method of selecting audio content for playback to a user of claim 1, wherein said third table having third selection criteria comprises a title table of title selection criteria of said predetermined selection criteria; and wherein said steps of incrementing and decrementing comprise:

incrementing a title weighting factor in said title table for each played audio selection if liked; and decrementing the title weighting factor in said title table for each played audio selection if disliked.

5. The method of selecting audio content for playback to a user of claim 1, further comprising the step of:

assigning selection criteria of said predetermined selection criteria from a predetermined external source for initially seeding said selection criteria.

6. The method of selecting audio content for playback to a user of claim 1, further comprising the step of:

selectively skipping to any of a next audio selection and a previous audio selection.

7. A computer implemented method for selecting audio content for playback to a user comprising the steps of:

providing a database having a plurality of audio selections, each said audio selection having predetermined selection criteria selectively assigned thereto;

assigning a genre weighting factor to each one of said plurality of audio selections;

assigning a title weighting factor to each one of said plurality of audio selections;

assigning an artist weighting factor to each one of said plurality of audio selections;

providing a genre table of genre selection criteria of said predetermined selection criteria;

providing an artist table of artist selection criteria of said predetermined selection criteria;

providing a title table of title selection criteria of said predetermined selection criteria;

selecting audio selections from said database based upon a selected one of said genre, title and artist tables, wherein the selecting of audio selections is further based upon a logarithmic relationship between a predetermined probability of selection of each audio selection and the genre weighting factor if the genre table is selected, the title weighting factor if the title table is selected, and the artist weighting factor if the artist table is selected;

playing audio selections from said database responsive to said step of selecting;

determining whether a user liked or disliked each played audio selection;

incrementing the genre weighting factor in said genre table for each played audio selection if the genre table is selected and if the played audio selection is liked;

decrementing the genre weighting factor in said genre table for each played audio selection if the genre table is selected and if the played audio section is disliked;

incrementing the title weighting factor in said title table for each played audio selection if the title table is selected and if the played audio selection is liked;

decrementing the title weighting factor in said title table for each played audio selection if the title table is selected and if the played audio selection disliked;

incrementing the artist weighting factor in said artist table for each played audio selection if the artist table is selected and if the played audio selection is liked; and decrementing the artist weighting factor in said artist table for each played audio selection if the artist table is selected and if the played audio selection disliked.

8. The method of selecting audio content for playback to a user of claim 7, further comprising the step of:

assigning selection criteria of said predetermined selection criteria from a predetermined external source for initially seeding selection criteria for at least one of said genre table, said artist table, and said title table.

9. The method of selecting audio content for playback to a user of claim 7, further comprising the step of:

selectively skipping to any of a next audio selection and a previous audio selection.

* * * * *